United States Patent
Van Niekerk et al.

(10) Patent No.: US 9,751,282 B2
(45) Date of Patent: Sep. 5, 2017

(54) PLASTIC COMPONENT

(71) Applicant: Bayerische Motoren Werke Aktiengesellschaft, Munich (DE)

(72) Inventors: Johann Van Niekerk, Munich (DE); Michael Kleinknecht, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/158,681

(22) Filed: May 19, 2016

(65) Prior Publication Data

US 2016/0257092 A1  Sep. 8, 2016

Related U.S. Application Data

(63) Continuation of application No. PCT/EP2014/073821, filed on Nov. 5, 2014.

(30) Foreign Application Priority Data

Jan. 17, 2014 (DE) .......... 10 2014 200 772

(51) Int. Cl.
*B32B 7/08* (2006.01)
*F16B 5/06* (2006.01)
*B29C 70/84* (2006.01)

(52) U.S. Cl.
CPC .......... *B32B 7/08* (2013.01); *B29C 70/845* (2013.01); *F16B 5/0657* (2013.01); *F16B 5/0664* (2013.01); *B32B 2605/00* (2013.01)

(58) Field of Classification Search
CPC .... F16B 5/0657; F16B 5/0664; F16B 5/0642; F16B 5/0628; F16B 21/086; F16B 21/088; F16B 21/09; F16B 9/02; B29C 70/00; B29C 70/845; B32B 2605/00; B32B 7/08; Y10T 16/10; Y10T 24/45257; Y10T 24/45529; Y10T 24/45545; Y10T 24/45262; B23K 35/0288; B62D 27/06
See application file for complete search history.

(56) References Cited

U.S. PATENT DOCUMENTS

| 2,040,365 A | * | 5/1936 | Diehl ............... B60R 13/02 156/211 |
| 2,217,085 A | | 10/1940 | Wheeler |
| 4,406,033 A | * | 9/1983 | Chisholm .......... A47G 27/0418 16/4 |
| 4,483,904 A | | 11/1984 | Church |

(Continued)

FOREIGN PATENT DOCUMENTS

| DE | 10 2010 015 179 A1 | 12/2010 |
| EP | 1 508 429 A1 | 2/2005 |
| WO | WO 2013/127576 A1 | 9/2013 |

OTHER PUBLICATIONS

Translation of EP1508429; published Feb. 23, 2005.*

(Continued)

*Primary Examiner* — Catherine A Simone
(74) *Attorney, Agent, or Firm* — Crowell & Moring LLP

(57) ABSTRACT

A plastic component includes a main part and a holding element having an anchoring portion and a holding portion. The diameter of the anchoring portion is greater than that of the holding portion and is embedded in or integrated into the main part in an interlocking and/or integrally bonded manner. The holding portion protrudes from the main part.

5 Claims, 2 Drawing Sheets

(56) References Cited

U.S. PATENT DOCUMENTS

2012/0284975 A1* 11/2012 Clarke ............... B60R 13/0206
24/595.1
2014/0294488 A1   10/2014 Van Niekerk et al.

OTHER PUBLICATIONS

B. Ferret et al., "Metal inserts in structural composite materials manufactured by RTM", Composites Part A 29A, 1998, XP4120881A, pp. 693-700.

International Search Report (PCT/ISA/210) issued in PCT Application No. PCT/EP2014/073821 dated Feb. 26, 2015, with English translation (six (6) pages).

Chinese Office Action issued in counterpart Chinese Application No. 201480063167.0 dated Dec. 30, 2016 with English-language translation (thirteen (13) pages).

* cited by examiner

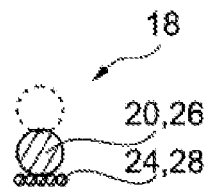
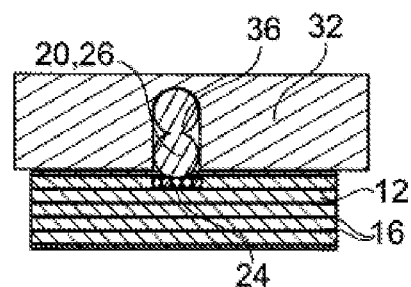
Fig. 4a Fig. 4b
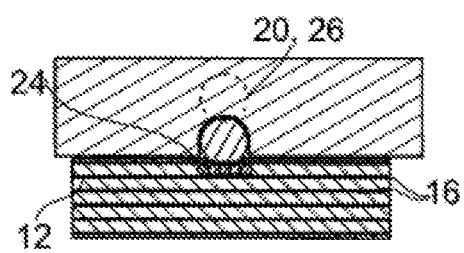
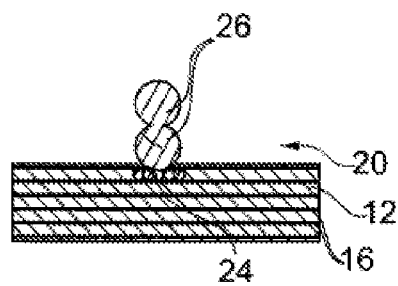
Fig. 4c Fig. 4d
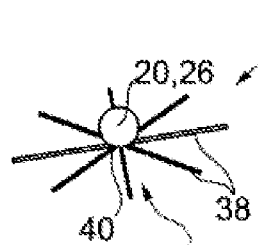
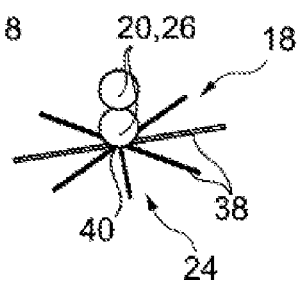
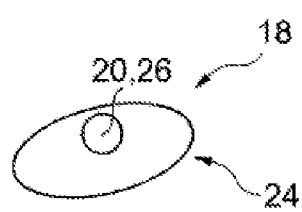
Fig. 5a Fig. 5b Fig. 6a
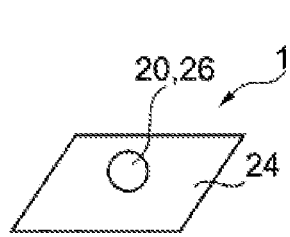
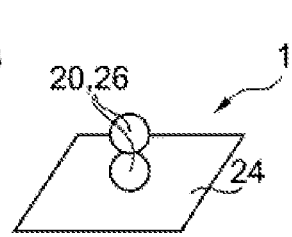
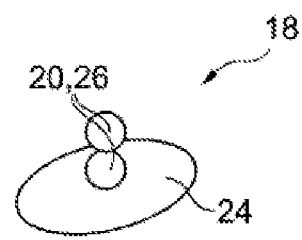
Fig. 7a Fig. 7b Fig. 6b

PLASTIC COMPONENT

CROSS REFERENCE TO RELATED APPLICATIONS

This application is a continuation of PCT International Application No. PCT/EP2014/073821, filed Nov. 5, 2014, which claims priority under 35 U.S.C. §119 from German Patent Application No. 10 2014 200 772.0, filed Jan. 17, 2014, the entire disclosures of which are herein expressly incorporated by reference.

BACKGROUND AND SUMMARY OF THE INVENTION

The invention relates to a plastic component with a main part and at least one holding element.

In the automotive field, fiber-reinforced plastic components are often used to replace metal components. Provided on the plastic components are holding elements for additional components. The holding elements have, for example, an indexing bolt, a screw thread, or another suitable holding geometry to fasten the additional components.

With the metal components used to date, such holding elements could be fastened in a simple fashion, for example by welding or soldering. However, attaching these holding elements to plastic components requires a much higher effort. For example, after producing the plastic component, the holding element can be glued onto the same. However, the firmness of that adhesive connection is often not sufficient. Another option is creating a positive connection by introducing a bore into the component and guiding the holding element from a rear side through the component until a widened flange of the holding element sits close on the rear side of the component. However, this process leads to a weakening of the component because of the boring.

Furthermore, both processes require additional work steps that make the production of the plastic components more expensive.

The object of the invention is to provide a plastic component with a main part and at least one holding element, which facilitates a simple and quick production as well as stable connection between the main part and the holding element.

To attain the object of the invention, a plastic component is provided having a main part and at least one holding element, which has an anchoring portion and a holding portion. The anchoring portion has an enlarged diameter relative to the holding portion and is embedded or integrated in the main part in a positive and/or firmly bonded manner. The holding portion protrudes from the main part. With this construction, the anchoring portion is held positively within the main part of the plastic component so that a reliable connection is created between the main part and the holding element. Furthermore, no additional work steps are required after the plastic component has been produced. Because furthermore, the anchoring portion is not glued to the component and no borings are required in the component, a smooth and even surface of the plastic component is created without additional reworking.

Preferably, the anchoring portion is formed by a plate that runs perpendicularly to the longitudinal direction of the holding portion. Such a plate also allows for a good pressure and, therefore, load distribution of the forces acting on the holding portion of the holding element on the plastic component. The size and form of the plate can be adapted depending on the intended use or the forces to be expected. For example, the plate may be designed angularly to allow, in addition, a better take-up of torques acting on the holding portion.

Alternately, the anchoring portion may also be formed by a plurality of longitudinal webs that are arranged radially relative to one another. The spaces between the webs can be filled with the material of the main part, therefore creating a better interlocking between holding element and main part. The webs furthermore allow for a better load distribution of the forces acting on the holding element to the main part and a better take-up of torsional forces.

Instead of the longitudinal webs, the anchoring portion can also be formed by a plurality of interlocked elements that are, in particular, arranged on one plane, in particular spheres. The elements can be arranged and interlocked depending on the load to be taken up and the form of the plastic component, therefore making it possible to adapt the anchoring portion to curved or bent plastic components as well.

For example, the holding portion of the holding element may have a screw thread to be able to fasten a screw at the holding element. Preferably, however, the holding portion has an indexing structure. The indexing structure may be developed rotation-symmetrically so that a component can be placed on the holding portion with any orientation. Furthermore, because the component is rotatable relative to the holding portion, no torques about the longitudinal axis of the holding element, which could lead to a detachment of the anchoring portion in the main part, can be transmitted to the holding portion and therefore the holding element.

For example, the holding portion can have one or a plurality of interlocked spheres. Said spheres have the advantage that a component can be placed on the sphere with a corresponding cup-shaped seat, which allows a rotation as well as a tilting of the component about the sphere of the holding portion. In addition to the movable seat, another advantage is that such a holding portion cannot exert a torque on the holding element and/or the anchoring portion so that the anchoring portion is reliably protected against torques acting on the same.

If the holding portion is formed by a plurality of spheres, the spheres can be interlocked prior to production. However, it is also possible to connect only one sphere to the anchoring portion and place the remaining spheres on the sphere connected to the anchoring portion after the production of the plastic component and connect them to the same and/or each other, for example by welding. In principle, only part of the holding portion can be fastened at the anchoring portion so that the holding portion protrudes from the main part after production of the plastic component. The remaining part of the holding portion can be mounted thereafter. If the holding portion is made of metal, this can be done by welding or soldering, for example.

Preferably, the plastic component is a fiber-reinforced plastic component with integrated fiber layers, which means that it can withstand higher loads.

For example, the anchoring portion is arranged between the fiber layers so that it is better integrated in the main part of the plastic component and can transmit higher loads.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 4a to 4d illustrates process steps of an alternate process for producing the plastic component in FIG. 1;

FIGS. 5a and 5b illustrate a second embodiment of a holding element for the plastic component in FIG. 1;

FIGS. 6a and 6b illustrate a third embodiment of a holding element for the plastic component in FIG. 1; and FIGS. 7a and 7b illustrate a fourth embodiment of a holding element for the plastic component in FIG. 1.

DETAILED DESCRIPTION OF THE DRAWINGS

Figure 1:
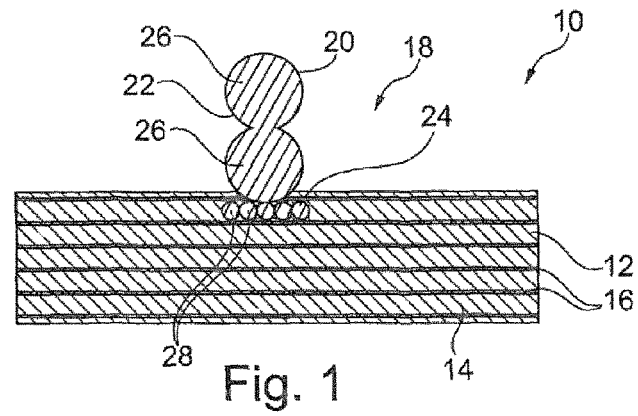
FIG. 1 is a cross-sectional view of a plastic component according to an embodiment of the invention.

FIG. 1 shows a plastic component 10, having a main part 12 formed of a plastic material 14 as well as a plurality of fiber layers 16. The plastic component 10 furthermore has a holding element 18, portions of which, as is explained in the following, are embedded or integrated in the main part 12.

Figure 2A:
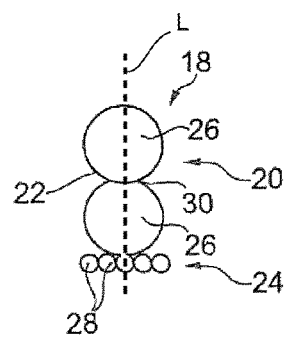
FIGS. 2a to 2c are detailed views of the holding element of the plastic component in FIG. 1.
Figure 2B:
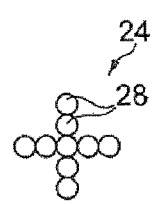
Figure 2C:
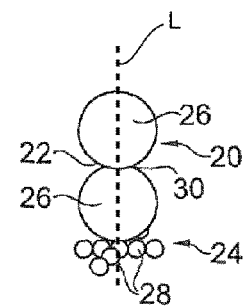

As is shown in the FIGS. 2a to 2c, the holding element 18 has an elongated holding portion 20 with a holding geometry 22 to which a further component can be fastened, as well as an anchoring portion 24 that is cast in the main part 12 of the plastic component 10.

The holding portion 20 of the holding element 18 is formed of two interconnected spheres 26, which form the holding geometry 22. At the upper sphere relative to FIG. 1, an additional component with a cup-shaped seat can be fastened. However, it is also possible that said seating engages both spheres 26.

The anchoring portion 24 is formed of a plurality of spheres 28, which are smaller compared to the spheres 26 and, in the embodiment, arranged cross-shaped and interlocked. The anchoring portion 24 is fastened to the holding portion 20 radially opposite the connecting point 30 at which the two spheres 26 of the holding portion are interlocked, so that the plane in which the sphere 28 is arranged runs perpendicularly to the longitudinal axis L of the holding portion 20.

As shown in FIG. 1, the anchoring portion 24 is embedded in the main part 12 of the plastic component 10, so that the anchoring portion is connected to the main part 12 in a positive and firmly bonded manner. This creates a stable connection between the main part 12 and the holding element 18.

Figure 3:
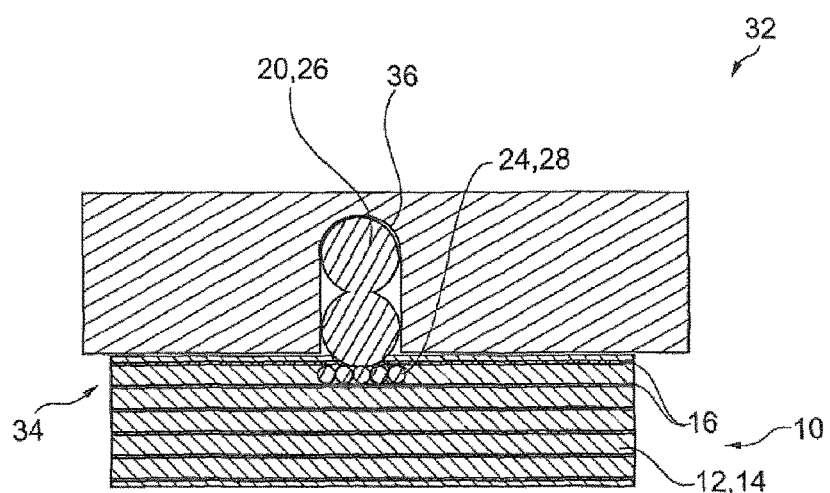
FIG. 3 illustrates a mold for producing the plastic component in FIG. 1.

A mold 32 for producing such a plastic component is shown in FIG. 3. The mold 32 has a receiving space 34 that essentially corresponds to the plastic component 10. Furthermore, at the interior wall of the mold 32, a receiver 36 is provided, which can accommodate the holding element 18 and/or the holding portion 20 of the holding element 18.

The receiver 36 is positioned at the mold 32 in such a fashion that the holding element 18 can be embedded in the main part 12 in the desired position when the mold 32 is filled with a liquid plastic material. To that end, the anchoring portion 24 protrudes from the receiver 36 into the receiving space 34 when the holding element 18 is inserted in the receiver 36 so that the plastic material 14 can enclose said receiving space 34.

To produce the plastic component 10, the holding element 18 is inserted into the receiver 36 in a first step. Then the fiber layers 16 are placed into the mold 32, the mold 32 is closed and filled with a liquid plastic material 14. After the plastic material 14 has hardened, the finished plastic component 10 can be removed from the mold 32.

To achieve an optimal integration of the anchoring portion 24 in the main part 12, the anchoring portion 24 is preferably arranged between the fiber layers 16. This can be done, for example, by inserting a plurality of fiber layers 16 into the mold 32 before the holding element 18 is introduced into the receiver 36, and the holding element 18 is pressed through the fiber layers 16 into the receiver 36. To that end, appropriate recesses that correspond to the receiver 36 can be provided in the fiber layers 16. However, it is also possible for the holding portion 20 to displace the fibers of the fiber layers 16 when pressed into the receiver 36.

An alternate production process for the plastic component 10 shown in FIG. 1 is shown in the FIGS. 4a to 4d. In this embodiment, only one sphere 26 of the holding portion 20 is connected to the anchoring portion 24 (FIG. 4a).

Accordingly, a receiver 36 is provided in the mold 32, which can accommodate only one sphere 26 (FIG. 4c). The production process occurs analogously to the production process described in FIG. 3.

After the main part 12 has hardened, the plastic component 10 is removed from the mold and the second sphere 26 of the holding portion 20 is connected to the first sphere 26, for example by welding it to the same.

The anchoring portion 24 can be developed randomly to create a firm bonding and positive connection between main part 12 and holding element 18. In particular, it has an optimally large area so that a broad load distribution onto the main part 12 is possible.

The FIGS. 5a and 5b show a second embodiment of a holding element 18. With this holding element 18 as well, the holding portion 20 is formed by one or two spheres 26. The anchoring portion 24, on the other hand, is formed by a plurality of radially arranged webs 38 that intersect with the holding portion 20 in the connecting point 40 of the anchoring portion 24.

This embodiment, as well as the embodiment shown in FIGS. 2a to 2c, has the advantage that the intermediate spaces between the webs 38 and/or the spheres 28 can be filled with plastic material so as to better integrate the anchoring portion 24 in the main part 12.

The embodiment of a holding element 18 shown in FIGS. 6a and 6b, on the other hand, have a plate-shaped anchoring portion 24, which is round in this embodiment.

So as to be able to transmit additional torques to the holding element 18, such a plate-shaped anchoring portion 24 can also be developed rectangular, as is shown in the embodiment in FIGS. 7a and 7b.

In the embodiments shown, the holding portion 20 is, in each case, formed by one or two spheres 26. The use of spheres has the advantage that a very flexible attachment of an additional component is possible because the component can be rotated and, to a limited extent, tilted about the seat with which the component is attached at the holding portion 20.

However, it is also possible to use other suitable holding portions 20 or holding geometries, for example with an indexing structure or a holding geometry that allows a torsion-proof fastening of the component at the plastic component.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A plastic component, comprising:
   a main part; and
   a holding element, the holding element comprising an anchoring portion and a holding portion, wherein
   the anchoring portion has a diameter greater than the holding portion,
   the anchoring portion is embedded in the main part in an interlocking and/or integrally bonded manner,
   the anchoring portion is formed by a plurality of interlocking elements that are spheres arranged in one plane,
   the holding portion protrudes from the main part, and
   the holding portion has a holding geometry to which a further component can be fastened.

2. The plastic component according to claim 1, wherein the holding portion has an indexing structure.

3. The plastic component according to claim 1, wherein the plastic component is a fiber-reinforced plastic component having a plurality of fiber layers integrated in the main part.

4. The plastic component according to claim 3, wherein the anchoring portion is arranged between respective ones of the plurality of fiber layers.

5. A plastic component, comprising:
   a main part; and
   a holding element, the holding element comprising an anchoring portion and a holding portion, wherein
   the anchoring portion has a diameter greater than the holding portion,
   the anchoring portion is embedded in the main part in an interlocking and/or integrally bonded manner,
   the anchoring portion is formed by a plurality of interlocking elements that are spheres arranged in one plane,
   the holding portion protrudes from the main part, and
   the holding portion comprises one or more interlocking spheres.

* * * * *